United States Patent
Kratzer et al.

(10) Patent No.: US 6,953,829 B2
(45) Date of Patent: Oct. 11, 2005

(54) CATALYST SYSTEM AND THE USE THEREOF

(75) Inventors: Roland Kratzer, Hofheim (DE); Cornelia Fritze, Frankfurt (DE); Jörg Schottek, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 55 days.

(21) Appl. No.: 10/168,646

(22) PCT Filed: Dec. 13, 2000

(86) PCT No.: PCT/EP00/12641

§ 371 (c)(1),
(2), (4) Date: Jun. 24, 2002

(87) PCT Pub. No.: WO01/47635

PCT Pub. Date: Jul. 5, 2001

(65) Prior Publication Data

US 2003/0008984 A1 Jan. 9, 2003

(30) Foreign Application Priority Data

Dec. 23, 1999 (DE) .......................... 199 62 814

(51) Int. Cl.[7] ............................ C08F 4/622; C08F 4/642
(52) U.S. Cl. ................ 526/160; 526/129; 526/132; 526/141; 526/147; 526/161; 526/164; 526/171; 526/172; 526/169.1; 502/103; 502/117; 502/123; 502/120; 502/118; 502/155
(58) Field of Search ................ 502/103, 117, 502/118, 120, 123, 155; 526/129, 132, 141, 147, 160, 161, 164, 171, 169.1, 172

(56) References Cited

U.S. PATENT DOCUMENTS

| | | | |
|---|---|---|---|
| 5,414,064 A | 5/1995 | Lux | |
| 5,596,115 A | 1/1997 | Commereuc | |
| 5,710,297 A | 1/1998 | Weller | |
| 5,929,264 A | 7/1999 | Rohrmann | |
| 5,990,254 A | 11/1999 | Weller | |
| 6,124,231 A | 9/2000 | Fritze | |
| 6,255,506 B1 | 7/2001 | Kuber | |
| 6,482,902 B1 * | 11/2002 | Bohnen et al. | 526/127 |

FOREIGN PATENT DOCUMENTS

| | | |
|---|---|---|
| DE | 2 108372 | 2/1971 |
| DE | 35 43360 | 6/1987 |
| DE | 196 32557 | 2/1998 |
| DE | 196 47070 | 5/1998 |
| DE | 197 44102 | 4/1999 |
| DE | 197 54540 | 6/1999 |
| DE | 198 04970 | 8/1999 |
| DE | 198 23168 | 11/1999 |
| DE | 198 23171 | 11/1999 |
| EP | 107 127 | 5/1984 |
| EP | 129 368 | 12/1984 |
| EP | 416 815 | 3/1991 |
| EP | 545 304 | 6/1993 |
| EP | 561 479 | 9/1993 |
| EP | 576 970 | 1/1994 |
| EP | 601 830 | 6/1994 |
| EP | 632 063 | 1/1995 |
| EP | 636 636 | 2/1995 |
| EP | 659 758 | 6/1995 |
| EP | 661 300 | 7/1995 |
| EP | 764 649 | 3/1997 |
| EP | 1 074557 | 2/2001 |
| WO | 91/09882 | 7/1991 |
| WO | 96/23005 | 8/1996 |
| WO | 98/22486 | 5/1998 |
| WO | WO 99/40129 * | 8/1999 |
| WO | 99/42467 | 8/1999 |
| WO | 99/67302 | 12/1999 |
| WO | 00/11006 | 3/2000 |

OTHER PUBLICATIONS

Macromolecules 1996, 29, 5241–5243, Scollard et al.
J. Am. Chem. Soc. 1996, 118, 10008–10009, Scollard et al.
J. Am. Chem. Soc. 1995, 117, 6414–6415, Johnson et al.
J. Am. Chem. Soc. 1996, 118, 267–268, Johnson et al.
J. Am. Chem. Soc. 1998, 120, 4049–4050, Small et al.
Chem. Commun. 1998, 849–850, Britovesk et al.

* cited by examiner

*Primary Examiner*—Roberto Rabago
(74) *Attorney, Agent, or Firm*—Keil & Weinkauf

(57) ABSTRACT

A catalyst system comprising at least one metallocene, at least one cocatalyst, at least one support material and, if desired, further organometallic compounds is described.

The catalyst system can advantageously be used for the polymerization of olefins and displays a high catalyst activity and gives a good polymer morphology without it being necessary to use aluminoxanes such as methylaluminoxane (MAO), which usually has to be used in high excess, as cocatalyst.

8 Claims, No Drawings

CATALYST SYSTEM AND THE USE THEREOF

The present invention relates to a catalyst system comprising at least one metallocene, at least one cocatalyst, at least one support material and, if desired, further organometallic compounds.

The catalyst system can advantageously be used for the polymerization of olefins and displays a high catalyst activity and gives a good polymer morphology without it being necessary to use aluminoxanes such as methylaluminoxane (MAO), which usually has to be used in high excess, as cocatalyst. Furthermore, the use of starting materials which could potentially be toxic is avoided.

For industrial utilization of metallocene catalysts, the catalyst system has to be made heterogeneous in order to ensure an appropriate morphology of the resulting polymers. Here, it is found to be advantageous to bind the components of the catalyst system covalently to the support so as to avoid "bleeding" of the active component from the support and thus an adverse effect on the polymer morphology.

A series of patents (see, for example, WO-96/23005, DE-A 19804970, DE-A 19744102, DE-A 19757540) describe catalyst systems in which the cocatalyst, namely an organoelement compound, is bound covalently to the support material with formation of an ammonium salt. A disadvantage of these systems is that they preferably employ tertiary anilines as organic bases and these are compounds which require particular protective measures in catalyst production because of their possible toxic or gene-toxic potential.

It is an object of the present invention to provide a catalyst system based on the covalent fixing of a cocatalyst to a support, which system avoids the disadvantages of the prior art.

We have found that this object is achieved by a catalyst system based on a specific class of toxicologically acceptable Lewis bases, which unexpectedly displays high polymerization activities and gives a good polymer morphology.

The catalyst system of the present invention comprises
a) at least one orgnaometallic compound selected from the group consisting of metallocenes, diamine complexes of metals of transition groups III and IV of the Periodic Table of the Elements, diimine complexes of metals of transition group VIII of the Periodic Table of the Elements and 2,6-bis(imino)pyridyl complexes of metals of transition group VIII of the Periodic Table of the Elements,
b) at least one Lewis base of the formula I,

where
M$^1$ is an element of main group V of the Periodic Table of the Elements,
R$^1$, R$^2$ and R$^3$ are identical or different and are each a hydrogen atom, a C$_1$–C$_{20}$-alkyl group, a C$_1$–C$_{20}$-haloalkyl group, a C$_6$–C$_{40}$-aryl group, a C$_6$–C$_{40}$-haloaryl group, a C$_7$–C$_{40}$-alkylaryl group or a C$_7$–C$_{40}$-arylalkyl group, where, if desired, two radicals or, if desired, all three radicals R$^1$, R$^2$ and R$^3$ may be joined to one another via C$_2$–C$_{20}$ units and at least one radical R$^1$, R$^2$ or R$^3$ is not a hydrogen atom or not a linear alkyl chain, with the exception of the compounds methylamine, aniline, dimethylamine, diethylamine, N-methylaniline, diphenylamine, trimethylamine, triethylamine, tripropylamine, tributylamine, N,N-dimethylaniline, N,N-diethylaniline, N,N-2,4,6-pentamethylaniline, diisopropylamine, dicyclohexylamine, methyldiphenylamine, pyridine, p-bromo-N,N-dimethylaniline, p-nitro-N,N-dimethylaniline, triethylphosphine, triphenylphosphine, tri(p-tolyl)phosphine, diphenylphosphine, tri(methylphenyl)phosphine, tri(dimethylphenyl)phosphine, trimethyl phosphite, 1,9-N,N,N,N-tetramethyl-1,8-naphthalenediamine, quinoline, decyldi(methyl)amine, dodecyldi(methyl)amine, tetradecyldi(methyl)amine, hexadecyldi(methyl)amine, octadecyldi(methyl)amine, eicosyldi(methyl)amine, methyldi(decyl)amine, methyldi(dodecyl)amine, methyldi(tetradecyl)amine, ethyldi(hexadecyl)amine, methyldi(octadecyl)amine, methyldi eicosyl)amine, decyldi(n-butyl)amine, methyldi(decyl)amine, dodecyldi(decyl)amine, octadecyldi(decyl)amine, N,N-didodecylaniline, N-methyl-N-dodecylaniline, N,N-di(octadecyl)(2, 4, 6-trimethylaniliniumamine, cyclohexyldi(dodecyl)amine, methyldi(dodecyl)amine, di(i-propyl)amine and dicyclohexylamine,
c) at least one support,
d) at least one organoelement compound which is made up of units of the formula II

where
R$^4$ and R$^5$ are identical or different and are each a hydrogen atom, a halogen atom, a C$_1$–C$_{40}$ group, in particular C$_1$–C$_{20}$-alkyl, C$_1$–C$_{20}$-haloalkyl, C$_1$–C$_{10}$-alkoxy, C$_6$–C$_{20}$-aryl, C$_6$–C$_{20}$-haloaryl, C$_6$–C$_{20}$-aryloxy, C$_1$–C$_{40}$-arylalkyl, C$_7$–C$_{40}$-haloarylalkyl, C$_7$–C$_{40}$-alkylaryl, C$_7$–C$_{40}$-haloalkylaryl or R$^4$ is an —OSiR$_3$ group, where R are identical or different and are as defined for R$^5$,
M$^2$ are identical or different and are each an element of main group III of the Periodic Table of the Elements, and
a, b and c are each an integer 0, 1, 2 or 3 and a+b+c is not equal to 0, and is covalently bound to the support,
and, if desired,
e) at least one organometallic compound of the formula III

where
M$^3$ is an element of main group I, II or III of the Periodic Table of the Elements,
R$^6$ are identical or different and are each a hydrogen atom, a halogen atom or a C$_1$–C$_{40}$ group, in particular C$_1$–C$_{20}$-alkyl, C$_6$–C$_{40}$-aryl, C$_7$–C$_{40}$-arylalkyl or C$_7$–C$_{40}$-alkylaryl,
d is an integer from 1 to 3 and
e is an integer from 1 to 4.

Preference is given to Lewis bases of the formula (I) in which R$^1$, R$^2$ and R$^3$ are identical or different and are each a hydrogen atom, a C$_1$–C$_{20}$-alkyl group, a C$_1$–C$_{20}$-haloalkyl group, a C$_6$–C$_{40}$-aryl group, a C$_6$–C$_{40}$-haloaryl group, a C$_7$–C$_{40}$-alkylaryl group or a C$_7$–C$_{40}$-arylalkyl group, where, if desired, two radicals or all three radicals R$^1$, R$^2$ and R$^3$ may be joined to one another via C$_2$–C$_{20}$ units and at least one radical R$^1$, R$^2$ or R$^3$ is an aromatic group which has from 2 to 20 carbon atoms and may be substituted and/or contain hetero atoms selected from the group consisting of P, O, S and N, with preference being given to at least one radical $R^1$, $R^2$ or $R^3$ being an alkylaryl group, in particular a benzylic group.

Examples of Lewis bases of the formula (I) are
N,N-dimethylcyclohexylamine, N,N-diethylcyclohexylamine, N,N-dimethylisopropylamine, N,N-diethylbenzylamine, N,N-dimethyl-p-toluidine, N,N-diethyl-p-toluidine, N,N-dimethylbenzylamine, N,N-diethylisopropylamine, N,N-diisopropylmethylamine, N,N-diisopropylethylamine, N,N-dimethylcyclopentylamine, N,N-dimethylcycloheptenylamine, N,N-dimethylcyclooctanylamine, N,N-dimethylnonanoylamine, N,N-diethylcyclopentylamine, N,N-diethylcycloheptenylamine, N,N-diethylcyclooctanylamine, N,N-diethylnonanoylamine, N-benzyldimethylamine, N-benzyldiethylamine, N-benzylbutylamine, N-benzyl tert-butylamine, N'-benzyl-N,N-dimethylethylenediamine, N-benzylethylenediamine, N-benzylisopropylamine, N-benzylmethylamine, N-benzylethylamine, N-benzyl-1-phenylethylamine, N-benzyl-2-phenylethylamine, or N-benzylpiperazine, N,N-dimethylisopropylamine, N,N-dimethyl-2-butylamine, N,N-dimethylisobutylamine, N,N-dimethyl-2-pentylamine, N,N-dimethyl-3-pentylamine, N,N-dimethyl-2-methylbutylamine, N,N-dimethyl-3-methylbutylamine, N,N-dimethylcyclopentylamine, N,N-dimethyl-2-hexylamine, N,N-dimethyl-3-hexylamine, N,N-dimethyl-2-methylpentylamine, N,N-dimethyl-3-methylpentylamine, N,N-dimethyl-4-methylpentylamine, N,N-dimethyl-2-ethylbutylamine, N,N-dimethylcyclohexylamine, N,N-dimethyl-2-heptylamine, N,N-dimethyl-3-heptylamine, N,N-dimethyl-4-heptylamine, N,N-dimethyl-2-methylhexylamine, N,N-dimethyl-3-methylhexylamine, N,N-dimethyl-4-methylhexylamine, N,N-dimethyl-5-methylhexylamine, N,N-dimethyl-2-ethylpentylamine, N,N-dimethyl-3-ethylpentylamine, N,N-dimethyl-2-propylbutylamine, N,N-dimethylcycloheptylamine, N,N-dimethylmethylcyclohexylamine, N,N-dimethylbenzylamine, N,N-dimethyl-2-octylamine, N,N-dimethyl-3-octylamine, N,N-dimethyl-4-octylamine, N,N-dimethyl-2-methylheptylamine, N,N-dimethyl-3-methylheptylamine, N,N-dimethyl-4-methylheptylamine, N,N-dimethyl-5-methylheptylamine, N,N-dimethyl-6-methylheptylamine, N,N-dimethyl-2-ethylhexylamine, N,N-dimethyl-3-ethylhexylamine, N,N-dimethyl-4-ethylhexylamine, N,N-dimethyl-2-propylpentylamine, N,N-dimethylcyclooctylamine, N,N-dimethyldimethylcyclohexylamine, N,N-diethylisopropylamine, N,N-diethyl-2-butylamine, N,N-diethylisobutylamine, N,N-diethyl-2-pentylamine, N,N-diethyl-3-pentylamine, N,N-diethyl-2-methylbutylamine, N,N-diethyl-3-methylbutylamine, N,N-diethylcyclopentylamine, N,N-diethyl-2-hexylamine, N,N-diethyl-3-hexylamine, N,N-diethyl-2-methylpentylamine, N,N-diethyl-3-methylpentylamine, N,N-diethyl-4-methylpentylamine, N,N-diethyl-2-ethylbutylamine, N,N-diethyl-cyclohexylamine, N,N-diethyl-2-heptylamine, N,N-diethyl-3-heptylamine, N,N-diethyl-4-heptylamine, N,N-diethyl-2-methylhexylamine, N,N-diethyl-3-methylhexylamine, N,N-diethyl-4-methylhexylamine, N,N-diethyl-5-methylhexylamine, N,N-diethyl-2-ethylpentylamine, N,N-diethyl-3-ethylpentylamine, N,N-diethyl-2-propylbutylamine, N,N-diethylcycloheptylamine, N,N-diethylmethylcyclohexylamine, N,N-diethylbenzylamine, N,N-diethyl-2-octylamine, N,N-diethyl-3-octylamine, N,N-diethyl-4-octylamine, N,N-diethyl-2-methylheptylamine, N,N-diethyl-3-methylheptylamine, N,N-diethyl-4-methylheptylamine, N,N-diethyl-5-methylheptylamine, N,N-diethyl-6-methylheptylamine, N,N-diethyl-2-ethylhexylamine, N,N-diethyl-3-ethylhexylamine, N,N-diethyl-4-ethylhexylamine, N,N-diethyl-2-propylpentylamine, N,N-diethyl-cyclooctylamine, N,N-diethyldimethylcyclohexylamine, N-methyl-N-ethylisopropylamine, N-methyl-N-ethyl-2-butylamine, N-methyl-N-ethylisobutylamine, N-methyl-N-ethyl-2-pentylamine, N-methyl-N-ethyl-3-pentylamine, N-methyl-N-ethyl-2-methylbutylamine, N-methyl-N-ethyl-3-methylbutylamine, N-methyl-N-ethylcyclopentylamine, N-methyl-N-ethyl-2-hexylamine, N-methyl-N-ethyl-3-hexylamine, N-methyl-N-ethyl-2-methylpentylamine, N-methyl-N-ethyl-3-methylpentylamine, N-methyl-N-ethyl-4-methylpentylamine, N-methyl-N-ethyl-2-ethylbutylamine, N-methyl-N-ethylcyclohexylamine, N-methyl-N-ethyl-2-heptylamine, N-methyl-N-ethyl-3-heptylamine, N-methyl-N-ethyl-4-heptylamine, N-methyl-N-ethyl-2-methylhexylamine N-methyl-N-ethyl-3-methylhexylamine, N-methyl-N-ethyl-4-methylhexylamine, N-methyl-N-ethyl-5-methylhexylamine, N-methyl-N-ethyl-2-ethylpentylamine, N-methyl-N-ethyl-3-ethylpentylamine, N-methyl-N-ethyl-2-propylbutylamine, N-methyl-N-ethyl-cycloheptylamine, N-methyl-N-ethyl-methylcyclohexylamine, N-methyl-N-ethylbenzylamine, N-methyl-N-ethyl-2-octylamine, N-methyl-N-ethyl-3-octylamine, N-methyl-N-eth 4-octylamine, N-methyl-N-ethyl-2-methylheptylamine, N-methyl-N-ethyl-3-methylheptylamine, N-methyl-N-ethyl-4-methylheptylamine, N-methyl-N-ethyl-5-methylheptylamine, N-methyl-N-ethyl-6-methylheptylamine, N-methyl-N-ethyl-2-ethylhexylamine, N-methyl-N-ethyl-3-ethylhexylamine, N-methyl-N-ethyl-4-ethylhexylamine, N-methyl-N-ethyl-2-propylpentylamine, N-methyl-N-ethylcyclooctylamine, N-methyl-N-ethyl-dimethylcyclohexylamine, N-methyldiisopropylamine, N-methylbis(2-butyl)amine, N-methylbis(isobutyl)amine, N-methylbis(2-pentyl)amine, N-methylbis(3-pentyl)amine, N-methylbis(2-methylbutyl)amine, N-methylbis(3-methylbutyl)amine, N-methyldicyclopentylamine, N-methylbis(2-hexyl)amine, N-methylbis(3-hexyl)amine, N-methylbis(2-methylpentyl)amine, N-methylbis(3-methylpentyl)amine, N-methylbis(4-methylpentyl)amine, N-methylbis(2-ethylbutyl)amine, N-methyldicyclohexylamine, N-methylbis(2-heptyl)amine, N-methylbis(3-heptyl)amine, N-methylbis(4-heptyl)amine, N-methylbis(2-methylhexyl)amine, N-methylbis(3-methylhexyl)amine, N-methylbis(4-methylhexyl)amine, N-methylbis(5-methylhexyl)amine, N-methylbis(2-ethylpentyl)amine, N-methylbis(3-ethylpentyl)amine, N-methylbis(2-propylbutyl)amine, N-methylbis(cycloheptyl)amine, N-methylbis(methylcyclohexyl)amine, N-methyldibenzylamine, N-methylbis(2-octyl)amine, N-methylbis(3-octyl)amine, N-methylbis(4-octyl)amine, N-methylbis(2-methylheptyl)amine, N-methylbis(3-methylheptyl)amine, N-methylbis(4-methylheptyl)amine, N-methylbis(5-methylheptyl)amine, N-methylbis(6-methylheptyl)amine, N-methylbis(2-ethylhexyl)amine, N-methylbis(3-ethylhexyl)amine, N-methylbis(4-ethylhexyl)amine, N-methylbis(2-propylpentyl)amine, N-methylbis(cyclooctyl)amine, N-methylbis(dimethylcyclohexyl)amine, N-ethyldiisopropylamine, N-ethylbis(2-butyl)amine, N-ethylbis(isobutyl)amine, N-ethylbis(2-pentyl)amine, N-ethylbis(3-pentyl)amine, N-ethylbis(2-methylbutyl) amine, N-ethylbis(3-methylbutyl)amine, N-ethyldicyclopentylamine, N-ethylbis(2-hexyl)amine, N-ethylbis(3-hexyl)amine, N-ethylbis(2-methylpentyl) amine, N-ethylbis(3-methylpentyl)amine, N-ethylbis(4-methylpentyl)amine, N-ethylbis(2-ethylbutyl)amine, N-ethyldicyclohexylamine, N-ethylbis(2-heptyl)amine, N-ethylbis(3-heptyl)amine, N-ethylbis(4-heptyl)amine, N-ethylbis(2-methylhexyl)amine, N-ethylbis(3-methylhexyl)amine, N-ethylbis(4-methylhexyl)amine, N-ethylbis(5-methylhexyl)amine, N-ethylbis(2-ethylpentyl)amine, N-ethylbis(3-ethylpentyl)amine, N-ethylbis(2-propylbutyl)amine, N-ethylbis(cycloheptyl) amine, N-ethylbis(methylcyclohexyl)amine, N-ethyldi(benzyl)amine, N-ethylbis(2-octyl)amine, N-ethylbis(3-octyl)amine, N-ethylbis(4-octyl)amine, N-ethylbis(2-methylheptyl)amine, N-ethylbis(3-methylheptyl)amine, N-ethylbis(4-methylheptyl)amine, N-ethylbis(5-methylheptyl)amine, N-ethylbis(6-methylheptyl)amine, N-ethylbis(2-ethylhexyl)amine, N-ethylbis(3-ethylhexyl) amine, N-ethylbis(4-ethylhexyl)amine, N-ethylbis(2-propylpentyl) amine, N-ethylbis (cyclooctyl) amine, N-ethylbis(dimethylcyclohexyl)amine.

Examples of particularly preferred bases are benzylamine, N-benzyldimethylamine, N-benzyldiethylamine, N-benzylbutylamine, N-benzyl tert-butylamine, N'-benzyl-N,N-dimethylethylendiamine, N-benzylethylenediamine, N-benzylisopropylamine, N-benzylmethylamine, N-benzylethylamine, N-benzyl-1-phenylethylamine, N-benzyl-2-phenylethylamine or N-benzylpiperazine.

The support is a porous inorganic or organic solid. The support preferably comprises at least one inorganic oxide such as silicon oxide, aluminum oxide, aluminosilicates, zeolites, MgO, $ZrO_2$, $TiO_2$, $B_2O_3$, CaO, ZnO, $ThO_2$, $Na_2CO_3$, $K_2CO_3$, $CaCO_3$, $MgCl_2$, $Na_2SO_4$, $Al_2(SO_4)_3$, $BaSO_4$, $KNO_3$, $Mg(NO_3)_2$, $Al(NO_3)_3$, $Na_2O$, $K_2$, $Li_2O$, or mixed oxides, in particular silicon oxide and/or aluminum oxide and/or Mg—Al mixed oxide. The support may also comprise at least one polymer, e.g. a homopolymer or copolymer, crosslinked polymer or a polymer blend. Examples of polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The support has a specific surface area in the range from 10 to 1000 $m^2/g$, preferably from 150 to 500 $m^2/g$. The mean particle size of the support is from 1 to 500 μm, preferably from 5 to 350 μm, particularly preferably from 10 to 200 μm.

The support is preferably porous with a pore volume of from 0.5 to 4.0 ml/g, preferably from 1.0 to 3.5 ml/g. A porous support has a certain proportion of voids (pore volume). The shape of the pores is usually irregular, frequently spherical. The pores can be connected to one another by small pore openings. The pore diameter is preferably from about 2 to 50 nm. The particle shape of the porous support depends on the after-treatment and can be irregular or spherical. The particle size of the support can be set to any desired value, for example, by cryogenic milling and/or sieving.

The catalyst system of the present invention comprises at least one organoelement compound comprising units of the formula (II) as cocatalytically active chemical compound. Preference is given to compounds of the formula (II) in which $M^2$ is boron or aluminum.

The compound comprising units of the formula (II) can be in the form of a monomer or a linear, cyclic or cage-like oligomer. It is also possible for two or more chemical compounds comprising units of the formula (II) to form dimers, trimers or higher associates with one another by means of Lewis acid-base interactions or condensation reactions.

Preferred cocatalytically active organoelement compounds d) have the formulae (IV) and (V),

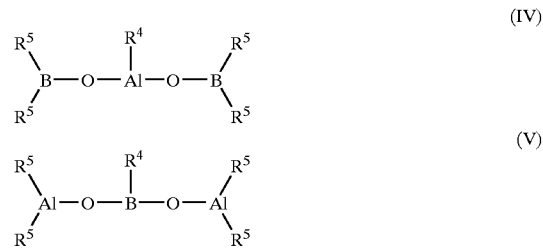

where $R^4$ and $R^5$ are as defined under formula (II).

Further cocatalytically active organoelement compounds which can be used according to the present invention are compounds in general which are formed by reaction of at least one compound of the formula (VI) and/or (VII) and/or (VIII) with at least one compound of the formula (IX),

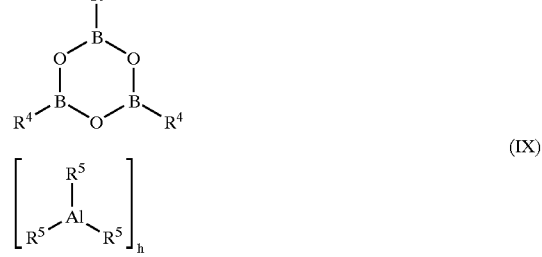

where $R^7$ is a hydrogen atom or a boron-free $C_1$–$C_{40}$ group such as $C_1$–$C_{20}$-alkyl, $C_6$–$C_{20}$-aryl, $C_7$–$C_{40}$-arylalkyl or $C_7$–$C_{40}$-alkylaryl and $R^4$ and $R^5$ are as defined under formula (II).

X is an element of main group VI of the Periodic Table of the Elements or an NR group, where R is a hydrogen atom or a $C_1$–$C_{20}$-hydrocarbon radical such as $C_1$–$C_{20}$-alkyl or $C_1$–$C_{20}$-aryl, f is an integer from 0 to 3, g is an integer from 0 to 3, where f+g is not equal to 0, and h is an integer from 1 to 10.

Examples of cocatalytically active compounds of the formulae (IV) and (V) are

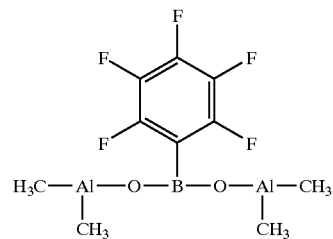

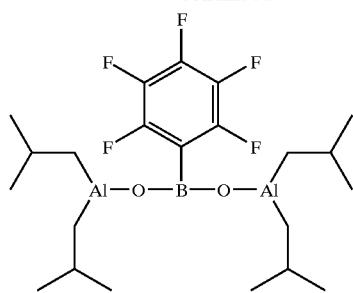
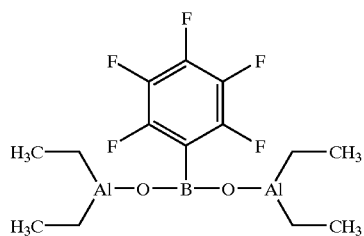
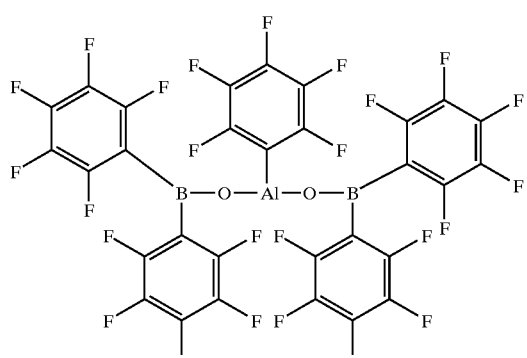
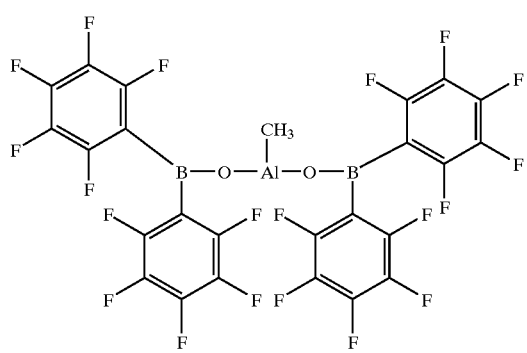
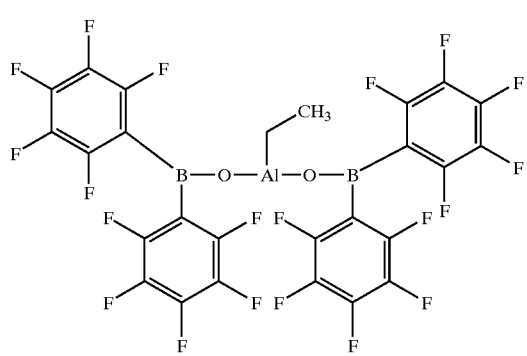
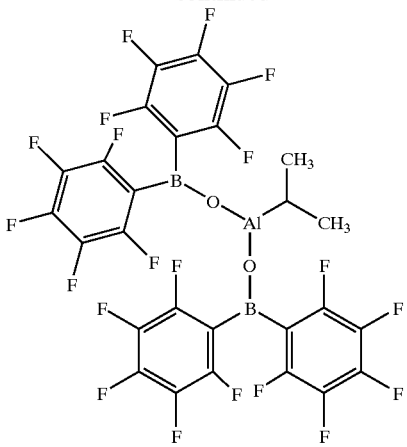
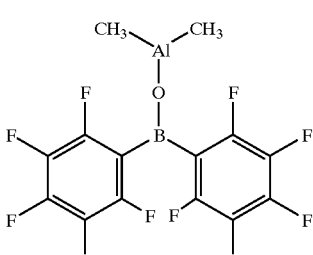
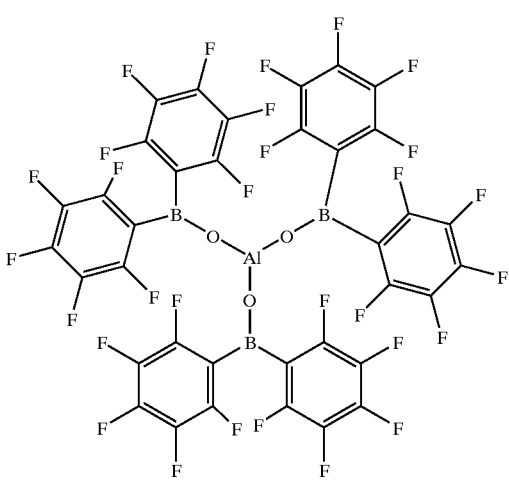
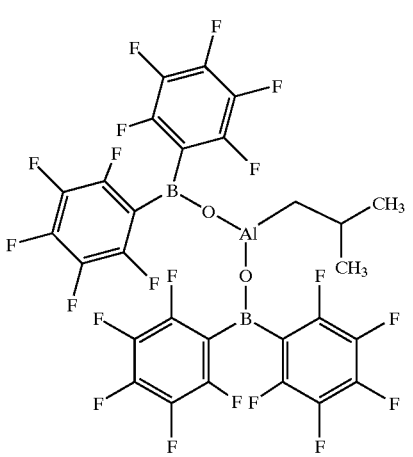

The organometallic compounds of the formula (III) are preferably uncharged Lewis acids in which $M^4$ is lithium, magnesium and/or aluminum, in particular aluminum. Examples of preferred organometallic compounds of the formula (III) are trimethylaluminum, triethylaluminum, triisopropylaluminum, trihexylaluminum, trioctylaluminum, tri-n-butylaluminum, triisobutylaluminum, tri-n-propylaluminum, triisoprenylaluminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane and o-tolylalane.

The metallocene compounds present in the catalyst system of the present invention can be, for example, bridged or unbridged biscyclopentadienyl complexes as are described, for example, in EP-A-0,129,368, EP-A-0,561,479, EP-A-0, 545,304 and EP-A-0,576,970, monocyclopentadienyl complexes such as bridged amidocyclopentadienyl complexes as are described, for example, in EP-A-0,416,815, polycyclic cyclopentadienyl complexes as are described, for example, in EP-A-0,632,063, p-ligand-substituted tetrahydropentalenes as are described, for example, in EP-A-0,659,758 or π-ligand-substituted tetrahydroindenes as are described, for example, in EP-A-0,661,300.

It is also possible to use organometallic compounds in which the complexing ligand does not contain a cyclopentadienyl ligand. Examples of such compounds are diamine complexes of metals of transition groups III and IV of the Periodic Table of the Elements, as are described, for example, by D. H. McConville et al, Macromolecules, 1996, 29, 5241 and D. H. McConville et al, J. Am. Chem. Soc., 1996, 118, 10008. Diimine complexes of metals of transition group VIII of the Periodic Table of the Elements (e.g. $Ni^{2+}$ or $Pd^{2+}$ complexes) as are described by Brookhart et al, J. Am. Chem. Soc. 1995, 117, 6414 and Brookhart et al, J. Am. Chem. Soc., 1996, 118, 267, can also be used. Furthermore, it is possible to use 2,6-bis(imino)pyridyl complexes of metals of transition group VIII of the Periodic Table of the Elements (e.g. $Co^{2+}$ or $Fe^{2+}$ complexes), as are described by Brookhart et al, J. Am. Chem. Soc. 1998, 120, 4049 and Gibson et al, Chem. Commun. 1998, 849. It is also possible to use metallocene compounds whose complexing ligand contains heterocycles. Examples are described in WO 98/22486.

Preferred metallocene compounds are unbridged or bridged compounds of the formula (X),

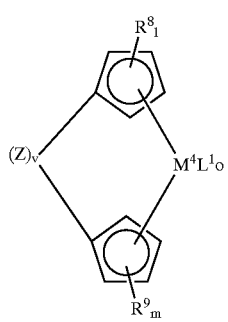

(X)

where $M^4$ is a metal of transition group III, IV, V or VI of the Periodic Table of the Elements, in particular Ti, Zr or Hf.

$R^8$ are identical or different and are each a hydrogen atom or $SiR_3$, where R are identical or different and are each a hydrogen atom or a $C_1$–$C_{40}$ group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^8$ are a $C_1$–$C_{30}$ group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_4$–$C_{24}$-heteroaryl such as pyridyl, furyl or quinolyl, $C_7$–$C_{30}$-arylalkyl, $C_5$–$C_{30}$-heteroarylalkyl, $C_7$–$C_{30}$-alkylaryl, $C_5$–$C_{30}$-alkylheteroaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^8$ may be joined to one another in such a way that the radicals $R^8$ and the atoms of the cyclopentadienyl ring which connect them form a carbocyclic or heterocyclic $C_4$–$C_{24}$ ring system which may in turn be substituted, $R^9$ are identical or different and are each a hydrogen atom or $SiR_3$, where R are identical or different and are each a hydrogen atom or a $C_1$–$C_{40}$ group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^9$ are a $C_1$–$C_{30}$ group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, e.g. pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^9$ may be joined to one another in such a way that the radicals $R^9$ and the atoms of the cyclopentadienyl ring which connect them form a carbocyclic or heterocyclic $C_4$–$C_{24}$ ring system which may in turn be substituted, l is 5 when v=0 and l is 4 when v=1, m is 5 when v=0 and m is 4 when v=1

$L^1$ may be identical or different and are each a hydrogen atom, a $C_1$–$C_{10}$-hydrocarbon group such as $C_1$–$C_{10}$-alkyl or $C_6$–$C_{10}$-aryl, a halogen atom or $OR^{12}$, $SR^{12}$, $OSiR^{12}_3$, $SiR^{12}_3$, $PR^{12}_2$ or $NR^{12}_2$, where $R^{12}$ is a halogen atom, a $C_1$–$C_{10}$-alkyl group, a $C_1$–$C_{10}$-alkoxy group, a halogenated $C_1$–$C_{10}$-alkyl group, a $C_6$–$C_{20}$-aryl group, a $C_7$–$C_{20}$-alkylaryl group, a $C_7$–$C_{20}$-arylalkyl group or a halogenated $C_6$–$C_{20}$-aryl group, or $L^1$ are a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2, Z is a bridging structural element between the two cyclopentadienyl rings and v is 0 or 1.

Examples of Z are $MR^{10}R^{11}$ groups, where M is carbon, silicon, germanium or tin and $R^{10}$ and $R^{11}$ are identical or different and are each a $C_1$–$C_{20}$-hydrocarbon-containing group such as $C_1$–$C_{10}$-alkyl, $c_6$—$C_{1-4}$-aryl or trimethylsilyl. Z is preferably $CH_2$, $CH_2CH_2$, $CH(CH_3)CH_2$, $CH(C_4Hg)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o—$C_6H_4$ or 2,2'-$(C_6H_4)_2$. Z together with one or more radicals $R^8$ and/or $R^9$ may also form a monocyclic or polycyclic ring system.

Preference is given to chiral bridged metallocene compounds of the formula (X), in particular those in which v is 1 and one or both cyclopentadienyl rings are substituted so that they form an indenyl ring, a sulfur-, nitrogen- or oxygen-containing heterocycle analogous to indenyl or a sulfur-, nitrogen- or oxygen-containing heterocycle analogous to pentalene.

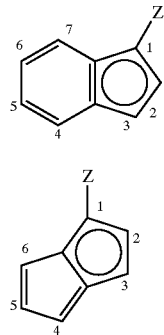

(XIa)

(XIb)

These rings are preferably substituted, in particular [in accordance with the nomenclature in the formulae (XIa) and (XIb)] in the 2 position, 4 position, 2,4 positions, 2,4,5 positions, 2,4,6 positions, 2,4,7 positions or 2,4,5,6 positions, by $C_1$–$C_{20}$ groups such as $C_1$–$C_{10}$-alkyl or $C_6$–$C_{20}$-aryl, where two or more substituents of the rings mentioned may together form a ring system.

Chiral bridged metallocene compounds of the formula (X) can be used as pure racemic or pseudo-racemic or pure meso or pseudo-meso compounds. However, it is also possible to use mixtures of a racemic or pseudo-racemic compound and a meso or pseudo-meso compound.

Examples of metallocene compounds are:
dimethylsilanediylbis(indenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyl-4-(1-naphthyl)indenyl)zirconium dichloride
dimethylsilanediylbis(2-methyl-4-(2-naphthyl)indenyl)zirconium dichloride
dimethylsilanediylbis(2-methyl-4-phenylindenyl)zirconium dichloride
dimethylsilanediylbis(2-methyl-4-t-butylindenyl)zirconium dichloride
dimethylsilanediylbis(2-methyl-4-isopropylindenyl)zirconium dichloride
dimethylsilanediylbis(2-methyl-4-ethylindenyl)zirconium dichloride
dimethylsilanediylbis(2-methyl-4-α-acenaphthindenyl)zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl)zirconium dichloride
dimethylsilanediylbis(2-methyl-4,5-benzoindenyl)zirconium dichloride
dimethylsilanediylbis(2-methyl-4,6-diisopropylindenyl)zirconium dichloride
dimethylsilanediylbis(2-methyl-4,5-diisopropylindenyl)zirconium dichloride
dimethylsilanediylbis(2,4,6-trimethylindenyl)zirconium dichloride
dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl)zirconium dichloride
dimethylsilanediylbis(2-methyl-5-t-butylindenyl)zirconium dichloride
methyl(phenyl)silanediylbis(2-methyl-4-phenylindenyl)zirconium dichloride
methyl(phenyl)silanediylbis(2-methyl-4,6-diisopropyl-indenyl)-zirconium dichloride
methyl(phenyl)silanediylbis(2-methyl-4-isopropylindenyl)-zirconium dichloride
methyl(phenyl)silanediylbis(2-methyl-4,5-benzoindenyl)zirconium dichloride
methyl(phenyl)silanediylbis(2-methyl-4,5-(methylbenzo)indenyl)-zirconium dichloride
methyl(phenyl)silanediylbis(2-methyl-4,5-(tetramethyl-benzo)-indenyl)zirconium dichloride
methyl(phenyl)silanediylbis(2-methyl-4-α-acenaphthindenyl)-zirconium dichloride
methyl(phenyl)silanediylbis(2-methylindenyl)zirconium dichloride
methyl(phenyl)silanediylbis(2-methyl-5-isobutylindenyl)zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6 diisopropylindenyl)zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride.
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
[4-($\eta^{5}$-cyclopentadienyl)-4,6,6-trimethyl-($\eta^{5}$-4,5-tetrahydro-pentalene)]dichlorozirconium
[4-($\eta^{5}$-3'-trimethylsilylcyclopentadienyl)-4,6,6-trimethyl($\eta^{5}$-4,5-tetrahydro-pentalene)]dichlorozirconium
[4-($\eta^{5}$-3'-isopropylcyclopentadienyl)-4,6,6-trimethyl($\eta^{5}$-4,5-tetrahydro-pentalene)]dichlorozirconium
[4-($\eta^{5}$-cyclopentadienyl)-4,7,7-trimethyl($\eta^{5}$-4,5, 6,7-tetrahydroindenyl)]dichlorotitanium
[4-($\eta^{5}$-cyclopentadienyl)-4,7,7-trimethyl($\eta^{5}$-4, 5, 6, 7-tetrahydroindenyl)]dichlorozirconium
[4-($\eta^{5}$-cyclopentadienyl)-4,7,7-trimethyl($\eta^{5}$-4,5,6,7-tetrahydroindenyl)]-dichlorohafnium
[4-($\eta^{5}$-3=-tert-butylcyclopentadienyl)-4,7,7-trimethyl($\eta^{5}$-4,5,6,7-tetrahydroindenyl)]dichlorotitanium
4-($\eta^{5}$-3=-isopropylcyclopentadienyl)-4,7,7-trimethyl($\eta^{5}$-4,5,6,7-tetrahydroindenyl)]dichlorotitanium
4-($\eta^{5}$-3=-methylcyclopentadienyl)-4,7,1-trimethyl($\eta^{5}$-4,5, 6,7-tetrahydroindenyl)]dichlorotitanium
4-($\eta^{5}$-3=-trimethylsilylcyclopentadienyl)-2-trimethylsilyl-4,7,7-trimethyl($\eta^{5}$-4,5,6,7-tetrahydroindenyl)]dichlorotitanium
4-($\eta^{5}$-3=-tert-butylcyclopentadienyl)-4,7,7-trimethyl($\eta^{5}$-4,5,6,7-tetrahydroindenyl)]dichlorozirconium
(tert-butylamido)(tetramethyl-$\eta^{5}$-cyclopentadienyl)dimethyl-silyldichlorotitanium (tert-butylamido)(tetramethyl-$\eta^5$-cyclopentadienyl)-1,2-ethane-diyldichlorotitanium
(methylamido)(tetramethyl-$\eta^5$-cyclopentadienyl)dimethylsilyl-dichlorotitanium
(methylamido)(tetramethyl-$\eta^5$-cyclopentadienyl)-1,2-ethanediyl-dichlorotitanium
(tert-butylamido)(2,4-dimethyl-2,4-pentadien-1-yl)dimethyl-silyldichlorotitanium
bis(cyclopentadienyl)zirconium dichloride
bis(n-butylcyclopentadienyl)zirconium dichloride
bis(1,3-dimethylcyclopentadienyl)zirconium dichloride
tetrachloro-[1-[bis($\eta^5$-1H-inden-1-ylidene)methylsilyl]-3-($\eta^5$-cyclopenta-2,4-dien-1-ylidene)-3-($\eta^5$-9H-fluoren-9-yliden)butane]-dizirconium
tetrachloro-[2-[bis($\eta^5$-2-methyl-1H-inden-1-ylidene)methoxysilyl]-5-($\eta^5$-2,3,4,5-tetramethylcyclopenta-2,4-dien-1-ylidene)-5-($\eta^5$-9H-fluoren-9-ylidene)hexane]dizirconium
tetrachloro-[1-[bis($\eta^5$-1H-inden-1-ylidene)methylsilyl]-6-($\eta^5$-cyclopenta-2,4-dien-1-ylidene)-6-($\eta^5$-9H-fluoren-9-ylidene)-3-oxa-heptane]dizirconium
dimethylsilanediylbis(2-methyl-4-(4'-tert-butylphenyl-indenyl)-zirconium dichloride
dimethylsilanediylbis(2-methyl-4-(4'-methylphenyl-indenyl)-zirconium dichloride
dimethylsilanediylbis(2-methyl-4-(4'-ethylphenylindenyl)-zirconium dichloride
dimethylsilanediylbis(2-methyl-4-(4'-trifluoromethyl-phenyl-indenyl) zirconium dichloride
dimethylsilanediylbis(2-methyl-4-(4'-methoxyphenyl-indenyl)-zirconium dichloride
dimethylsilanediylbis(2-ethyl-4-(4'-tert-butylphenyl-indenyl)-zirconium dichloride
dimethylsilanediylbis(2-ethyl-4-(4'-methylphenylindenyl)-zirconium dichloride
dimethylsilanediylbis(2-ethyl-4-(4'-ethylphenylindenyl)-zirconium dichloride
dimethylsilanediylbis(2-ethyl-4-(4'-trifluoromethylphenyl-indenyl)zirconium dichloride
dimethylsilanediylbis(2-ethyl-4-(4'-methoxyphenyl-indenyl)-zirconium dichloride
dimethylsilanediylbis(2-methyl-4-(4'-tert-butylphenyl-indenyl)-dimethylzirconium
dimethylsilanediylbis(2-methyl-4-(4'-methylphenyl-indenyl)-dimethylzirconium
dimethylsilanediylbis(2-methyl-4-(4'-ethylphenylindenyl)dimethylzirconium
dimethylsilanediylbis(2-methyl-4-(4'-trifluoromethyl-phenyl-indenyl)dimethylzirconium
dimethylsilanediylbis(2-methyl-4-(4'-methoxyphenyl-indenyl)-dimethylzirconium
dimethylsilanediylbis(2-ethyl-4-(4'-tert-butylphenyl-indenyl)-dimethylzirconium
dimethylsilanediylbis(2-ethyl-4-(4'-methylphenylindenyl)dimethylzirconium
dimethylsilanediylbis(2-ethyl-4-(4'-ethylphenylindenyl)dimethylzirconium
dimethylsilanediylbis(2-ethyl-4-(4'-trifluoromethylphenyl-indenyl)dimethylzirconium
dimethylsilanediylbis(2-ethyl-4-(4'-methoxyphenyl-indenyl)-dimethylzirconium
dimethylsilanediylbis(2-methyl-4-(4'-trimethylsilylphenyl-indenyl) zirconium dichloride
dimethylsilanediylbis(2-methyl-4-(4'-trimethylsilylphenyl-indenyl) dimethylzirconium
dimethylsilanediylbis(2-ethyl-4-(4'-trimethylsilylphenyl-indenyl)-zirconium dichloride
dimethylsilanediylbis(2-ethyl-4-(4'-trimethylsilylphenyl-indenyl)-dimethylzirconium
dimethylsilanediylbis(2-methyl-4-(4'-tert-butylphenyl)indenyl)-hafnium dichloride
dimethylsilanediylbis(2-methyl-4-(4'-tert-butylphenyl)indenyl)-titanium dichloride
dimethylsilanediylbis(2-methyl-4-(4'-methylphenyl)indenyl)-zirconium dichloride
dimethylsilanediylbis(2-methyl-4-(4'-n-propylphenyl)indenyl)-zirconium dichloride
dimethylsilanediylbis(2-methyl-4-(4'-n-butylphenyl)indenyl)-zirconium dichloride
dimethylsilanediylbis(2-methyl-4-(4'-hexylphenyl)indenyl)-zirconium dichloride
dimethylsilanediylbis(2-methyl-4-(4'-sec-butylphenyl)indenyl)-zirconium dichloride
dimethylsilanediylbis(2-ethyl-4-phenyl)indenyl)zirconium dichloride
dimethylsilanediylbis(2-ethyl-4-(4'-methylphenyl)indenyl)-zirconium dichloride
dimethylsilanediylbis(2-ethyl-4-(4'-ethylphenyl)indenyl)-zirconium dichloride
dimethylsilanediylbis(2-ethyl-4-(4'-n-propylphenyl)indenyl)-zirconium dichloride
dimethylsilanediylbis(2-ethyl-4-(4'-n-butylphenyl)indenyl)-zirconium dichloride
dimethylsilanediylbis(2-ethyl-4-(4'-hexylphenyl)indenyl)-zirconium dichloride
dimethylsilanediylbis(2-ethyl-4-(4'-pentylphenyl)indenyl)-zirconium dichloride
dimethylsilanediylbis(2-ethyl-4-(4'-cyclohexylphenyl)indenyl)-zirconium dichloride
dimethylsilanediylbis(2-ethyl-4-(4'-sec-butylphenyl)indenyl)-zirconium dichloride
dimethylsilanediylbis(2-ethyl-4-(4'-tert-butylphenyl)indenyl)-zirconium dichloride
dimethylsilanediylbis(2-n-propyl-4-phenyl)indenyl)zirconium dichloride
dimethylsilanediylbis(2-n-propyl-4-(4'-methylphenyl)indenyl)-zirconium dichloride
dimethylsilanediylbis(2-n-propyl-4-(4'-ethylphenyl)indenyl)-zirconium dichloride
dimethylsilanediylbis(2-n-propyl-4-(4'-iso-propylphenyl)indenyl)-zirconium dichloride
dimethylsilanediylbis(2-n-propyl-4-(4'-n-butylphenyl)indenyl)-zirconium dichloride
dimethylsilanediylbis(2-n-propyl-4-(4'-hexylphenyl)indenyl)-zirconium dichloride
dimethylsilanediylbis(2-n-propyl-4-(4'-cyclohexylphenyl)indenyl)-zirconium dichloride
dimethylsilanediylbis(2-n-propyl-4-(4'-sec-butylphenyl)indenyl)-zirconium dichloride
dimethylsilanediylbis(2-n-propyl-4-(4'-tert-butylphenyl)indenyl)-zirconium dichloride
dimethylsilanediylbis(2-n-butyl-4-phenyl)indenyl)zirconium dichloride
dimethylsilanediylbis(2-n-butyl-4-(4'-methylphenyl)indenyl)-zirconium dichloride
dimethylsilanediylbis(2-n-butyl-4-(4'-ethylphenyl)indenyl)-zirconium dichloride
dimethylsilanediylbis(2-n-butyl-4-(4'-n-propylphenyl)indenyl)-zirconium dichloride
dimethylsilanediylbis(2-n-butyl-4-(4'-iso-propylphenyl)indenyl)-zirconium dichloride
dimethylsilanediylbis(2-n-butyl-4-(4'-n-butylphenyl)indenyl)-zirconium dichloride
dimethylsilanediylbis(2-n-butyl-4-(4'-hexylphenyl)indenyl)-zirconium dichloride dimethylsilanediylbis(2-n-butyl-4-(4'-cyclohexylphenyl)
 indenyl)-zirconium dichloride
dimethylsilanediylbis(2-n-butyl-4-(4'-sec-butylphenyl)
 indenyl)-zirconium dichloride
dimethylsilanediylbis(2-n-butyl-4-(4'-tert-butylphenyl)
 indenyl)-zirconium dichloride
dimethylsilanediylbis(2-hexyl-4-phenyl)indenyl)zirconium
 dichloride
dimethylsilanediylbis(2-hexyl-4-(4'-methylphenyl)
 indenyl)-zirconium dichloride
dimethylsilanediylbis(2-hexyl-4-(4'-ethylphenyl)indenyl)-
 zirconium dichloride
dimethylsilanediylbis(2-hexyl-4-(4'-n-propylphenyl)
 indenyl)-zirconium dichloride
dimethylsilanediylbis(2-hexyl-4-(4'-iso-propylphenyl)
 indenyl)-zirconium dichloride
dimethylsilanediylbis(2-hexyl-4-(4'-n-butylphenyl)
 indenyl)-zirconium dichloride
dimethylsilanediylbis(2-hexyl-4-(4'-hexylphenyl)indenyl)-
 zirconium dichloride
dimethylsilanediylbis(2-hexyl-4-(4'-cyclohexylphenyl)
 indenyl)-zirconium dichloride
dimethylsilanediylbis(2-hexyl-4-(4'-sec-butylphenyl)
 indenyl)-zirconium dichloride
dimethylsilanediylbis(2-hexyl-4-(4'-tert-butylphenyl)
 indenyl)-zirconium dichloride
dimethylsilanediylbis(2-methyl-4-(4'-tert-butylphenyl)
 indenyl)-zirconium bis(dimethylamide)
dimethylsilanediylbis(2-ethyl-4-(4'-tert-butylphenyl)
 indenyl)-dibenzylzirconium
dimethylsilanediylbis(2-methyl-4-(4'-tert-butylphenyl)
 indenyl)-dimethylzirconium
dimethylgermanediylbis(2-ethyl-4-(4'-tert-butylphenyl)
 indenyl)-zirconium dichloride
dimethylgermanediylbis(2-ethyl-4-(4'-tert-butylphenyl)
 indenyl)-hafnium dichloride
dimethylgermanediylbis(2-propyl-4-(4'-tert-butylphenyl)
 indenyl)-titanium dichloride
dimethylgermanediylbis(2-methyl-4-(4'-tert-butylphenyl)
 indenyl)-zirconium dichloride
ethylidenebis(2-ethyl-4-phenyl)indenyl)zirconium dichloride
ethylidenebis(2-ethyl-4-(4'-tert-butylphenyl)indenyl)
 zirconium dichloride
ethylidenebis(2-n-propyl-4-(4'-tert-butylphenyl)indenyl)-
 zirconium dichloride
ethylidenebis(2-n-butyl-4-(4'-tert-butylphenyl)indenyl)
 titanium dichloride
ethylidenebis(2-hexyl-4-(4'-tert-butylphenyl)indenyl)
 dibenzyl-zirconium
ethylidenebis(2-ethyl-4-(4'-tert-butylphenyl)indenyl)
 dibenzyl-hafnium
ethylidenebis(2-methyl-4-(4'-tert-butylphenyl)indenyl)
 dibenzyl-titanium
ethylidenebis(2-methyl-4-(4'-tert-butylphenyl)indenyl)
 zirconium dichloride
ethylidenebis(2-ethyl-4-(4'-tert-butylphenyl)indenyl)
 dimethyl-hafnium
ethylidenebis(2-n-propyl-4-phenyl)indenyl)
 dimethyltitanium
ethylidenebis(2-ethyl-4-(4'-tert-butylphenyl)indenyl)
 zirconium bis(dimethylamide)
ethylidenebis(2-ethyl-4-(4'-tert-butylphenyl)indenyl)
 hafnium bis(dimethylamide)
ethylidenebis(2-ethyl-4-(4'-tert-butylphenyl)indenyl)
 titanium bis(dimethylamide)
methylethylidenebis(2-ethyl-4-(4'-tert-butylphenyl)
 indenyl)-zirconium dichloride
methylethylidenebis(2-ethyl-4-(4'-tert-butylphenyl)
 indenyl)-hafnium dichloride.

Further examples are metallocenes from the above list in which "dichloride" is replaced by the following ligands:
monochloride mono(2,4-di-tert-butylphenoxide)
monochloride mono(2,6-di-tert-butylphenoxide)
monochloride mono(3,5-di-tert-butylphenoxide)
monochloride mono(2,6-di-sec-butylphenoxide)
monochloride mono(2,4-di-methylphenoxide)
monochloride mono(2,3-di-methylphenoxide)
monochloride mono(2,5-di-methylphenoxide)
monochloride mono(2,6-di-methylphenoxide)
monochloride mono(3,4-di-methylphenoxide)
monochloride mono(3,5-di-methylphenoxide)
monochloride monophenoxide
monochloride mono(2-methylphenoxide)
monochloride mono(3-methylphenoxide)
monochloride mono(4-methylphenoxide)
monochloride mono(2-ethylphenoxide)
monochloride mono(3-ethylphenoxide)
monochloride mono(4-ethylphenoxide)
monochloride mono(2-sec-butylphenoxide)
monochloride mono(2-tert-butylphenoxide)
monochloride mono(3-tert-butylphenoxide)
monochloride mono(4-sec-butylphenoxide)
monochloride mono(4-tert-butylphenoxide)
monochloride mono(2-isopropyl-5-methylphenoxide)
monochloride mono(4-isopropyl-3-methylphenoxide)
monochloride mono(5-isopropyl-2-methylphenoxide)
monochloride mono(5-isopropyl-3-methylphenoxide)
monochloride mono(2,4-bis-(2-methyl-2-butyl)phenoxide)
monochloride mono(2,6-di-tert-butyl-4-methylphenoxide)
monochloride mono(4-nonylphenoxide)
monochloride mono(1-naphthoxide)
monochloride mono(2-naphthoxide)
monochloride mono(2-phenylphenoxide)
monochloride mono(tert-butoxide)
monochloride mono(N-methylanilide)
monochloride mono(2-tert-butylanilide)
monochloride mono(tert-butylamide)
monochloride mono(di-iso-propylamide)
monochloride monomethyl
monochloride monobenzyl
monochloride mononeopentyl.

The catalyst system of the present invention is obtainable by reacting at least one Lewis base of the formula (I) and at least one organoelement compound made up of units of the formula (II) with a support. The product is subsequently reacted with a solution or suspension of one or more metallocene compounds of the formula (X) and, if desired, one or more organometallic compounds of the formula (III). This activation of the catalyst system can be carried out either before introduction into the reactor or else only in the reactor.

To prepare the catalyst system of the present invention, the support material is suspended in an organic solvent. Suitable solvents are aromatic or aliphatic solvents, for example hexane, heptane, toluene or xylene, or halogenated hydrocarbons such as methylene chloride or halogenated aromatic hydrocarbons such as o-dichlorobenzene. The support can be pretreated beforehand with a compound of the formula (III). One or more compounds of the formula (I) is/are subsequently added to the suspension, with the reaction time being able to be from one minute to 48 hours, preferably from 10 minutes to 2 hours. The reaction product can be isolated and subsequently resuspended or else can be reacted directly with at least one cocatalytically active organoboron-aluminum compound made up of units of the formula (II). The reaction time here is from one minute to 48 hours, preferably from 10 minutes to 2 hours. Preference is given to using from 0.1 to 4 equivalents of a Lewis base of the formula (I) per equivalent of units of the formula (II). Particular preference is given to using from 0.5 to 1 equivalent of a Lewis base of the formula (I) per equivalent of units of the formula (II). The reaction product of this reaction is a compound which is capable of forming metallocene ions and is covalently bound to the support material. This is hereinafter referred to as the modified support material. The reaction mixture is subsequently filtered and the solid is washed with one of the above-mentioned solvents. The modified support material is then dried in a high vacuum. The modified support material can be resuspended after drying and be after-treated with a compound of the formula (III). However, the compound of the formula (III) can also be added before filtration and drying of the modified support material. The application of one or more metallocene compounds, preferably of the formula (X), and one or more organometallic compounds of the formula (III) to the modified support material is preferably carried out by dissolving or suspending one or more metallocene compounds of the formula (X) in one of the above-described solvents and subsequently reacting it with one or more compounds of the formula (III) which is/are preferably likewise in dissolved or suspended form. The stoichiometric ratio of metallocene compound of the formula (X) to the organometallic compound of the formula (III) is from 100:1 to $10^{-4}$:1. The ratio is preferably from 1:1 to $10^{-2}$:1. The modified support material can either be placed directly in the polymerization reactor or in a reaction flask in one of the above-mentioned solvents. This is followed by the addition of the mixture of a metallocene compound of the formula (X) and an organometallic compound of the formula (III). However, if desired, one or more metallocene compounds of the formula (X) can also be added to the modified support material without prior addition of an organometallic compound of the formula (III).

The ratio of modified support to metallocene compound of the formula (X) is preferably from 10 g:1 $\mu$mol to $10^{-2}$ g:1 $\mu$mol. The stoichiometric ratio of metallocene compound of the formula (X) to units of the formula (II), of which the supported cocatalytically active organoelement compound is made up, is from 100:1 to $10^{-4}$:1, preferably from 1:1 to $10^{-2}$:1.

All of the above-described reactions for preparing the catalyst system of the present invention are preferably carried out at from −40 to 110° C., particularly preferably from −10° C. to 70° C.

The supported catalyst system can be used directly for polymerization. However, it is also possible to remove the solvent and resuspend the catalyst system before use in the polymerization. The advantage of this activation method is that it offers the option of allowing the polymerization-active catalyst system to be formed only in the reactor. This prevents occurrence of partial decomposition when introducing the air-sensitive catalyst.

Furthermore, the invention provides a process for preparing an olefin polymer in the presence of the catalyst system of the present invention. The polymerization can be a homopolymerization or a copolymerization. Preference is given to preparing homopolymers or copolymers of propylene.

Preference is given to polymerizing olefins of the formula $R^\alpha$—CH=CH—$R^\beta$, where $R^\alpha$ and $R^\beta$ are identical or different and are each a hydrogen atom, a halogen atom, an alkoxy, hydroxy, alkylhydroxy, aldehyde, carboxyl or carboxylic ester group or a saturated or unsaturated hydrocarbon radical having from 1 to 20 carbon atoms, in particular from 1 to 10 carbon atoms, which may be substituted by an alkoxy, hydroxyl, alkylhydroxy, aldehyde, carboxyl or carboxylic ester group, or $R^\alpha$ and $R^\beta$ together with the atoms connecting them form one or more rings. Examples of such olefins are 1-olefins, such as ethylene, propylene, 1-butene, 1-hexene, 4-methyl-1-pentene, 1-octene, styrene, cyclic olefins, such as norbornene, vinylnorbornene, tetracyclododecene, ethylidenenorbornene, dienes such as 1,3-butadiene or 1,4-hexadiene, biscyclopentadiene or methyl methacrylate.

In particular, propylene or ethylene are homopolymerized, ethylene is copolymerized with one or more $C_3$–$C_{20}$-1-olefins, in particular propylene, and/or one or more $C_4$–$C_{20}$-dienes, in particular 1,3-butadiene, or norbornene and ethylene are copolymerized.

The polymerization is preferably carried out at from −60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported catalyst system can either be formed directly in the polymerization system or can be resuspended as powder or while still moist with solvent and introduced into the polymerization system as a suspension in an inert suspension medium.

A prepolymerization can be carried out by means of the catalyst system of the present invention. The prepolymerization is preferably carried out using the (or one of the) olefin(s) used in the polymerization.

To prepare olefin polymers having a broad molecular weight distribution, preference is given to using catalyst systems comprising two or more different transition metal compounds, e.g. metallocenes, and/or two or more different cocatalytically active organoelement compounds.

To remove catalyst poisons present in the olefin, purification using an aluminum alkyl, for example trimethylaluminum, triethylaluminum or triisobutylaluminum, is advantageous. Either this purification can be carried out in the polymerization system itself or the olefin is brought into contact with the Al compound and subsequently separated off again before introduction into the polymerization system.

As molar mass regulator and/or to increase the activity, hydrogen is added if necessary. The total pressure in the polymerization system is from 0.5 to 2500 bar, preferably from 2 to 1500 bar.

The compound used according to the present invention is employed in a concentration, based on the transition metal, of preferably from $10^{-3}$ to $10^{-8}$ mol, more preferably from $10^{-4}$ to $10^{-7}$ mol, of transition metal per dm$^3$ of solvent or per dm$^3$ of reactor volume.

Suitable solvents for preparing both the supported chemical compound used according to the present invention and the catalyst system of the present invention are aliphatic or aromatic solvents, for example hexane or toluene, ether solvents such as tetrahydrofuran or diethyl ether or halogenated hydrocarbons such as methylene chloride or halogenated aromatic hydrocarbons such as o-dichlorobenzene.

Before addition of the catalyst system of the present invention or before activation of the catalyst system of the present invention in the polymerization system, an alkylaluminum compound such as trimethylaluminum, triethylaluminum, triisobutylaluminum, trioctylaluminum or isoprenylaluminum can be additionally introduced into the reactor to make the polymerization system inert (for example to remove catalyst poisons present in the olefin). This is added to the polymerization system in a concentration of from 200 to 0.001 mmol of Al per kg of reactor contents. Preference is given to using triisobutylaluminum and triethylaluminum in a concentration of from 10 to 0.01 mmol of Al per kg of reactor contents, as a result of which a low molar $Al/M^1$ ratio can be chosen in the synthesis of a supported catalyst system.

Furthermore, an additive such as an antistatic can be used in the process of the present invention, for example to improve the particle morphology of the olefin polymer. In general, it is possible to use all antistatics which are suitable for polymerization. Examples are salt mixtures of calcium salts of Medialan acid and chromium salts of N-stearylanthranilic acid, as described in DE-A-3,543,360. Further suitable antistatics are, for example, isopropanol, $C_{12}$–$C_{22}$-fatty acid soaps of alkali metals or alkaline earth metals, salts of sulfonic esters, esters of polyethylene glycols and fatty acids, polyoxyethylene alkyl ethers, etc. A review of antistatics is given in EP-A-0,107,127.

Furthermore, a mixture of a metal salt of Medialan acid, a metal salt of anthranilic acid and a polyamine can be used as antistatic, as described in EP-A-0,636,636.

Commercially available products such as Stadis® 450 from DuPont, namely a mixture of toluene, isopropanol, dodecylbenzenesulfonic acid, a polyamine, a copolymer of 1-decene and $SO_2$ and also 1-decene, or ASA®-3 from Shell and Atmer 163 from ICI can likewise be used.

The antistatic is preferably used as a solution; in the preferred case of isopropanol, Stadis® 450 and Atmer 163 are preferably used in an amount of from 1 to 50% by weight of this solution, preferably from 5 to 25% by weight, based on the mass of the supported catalyst (support with covalently bound compound capable of forming metallocene ions and one or more metallocene compounds, e.g. of the formula (X)) used. However, the amounts of antistatic required can vary within a wide range, depending on the type of antistatic used.

The actual polymerization is preferably carried out in liquid monomers (bulk) or in the gas phase.

The antistatic can be introduced into the polymerization at any point in time. For example, a preferred procedure is to resuspend the supported catalyst system in an organic solvent, preferably alkanes such as heptane or isododecane. It is subsequently introduced into the polymerization autoclave while stirring. The antistatic is then added. The polymerization is carried out at from 0 to 100° C. A further preferred procedure is to introduce the antistatic into the polymerization autoclave before addition of the supported catalyst system. The resuspended supported catalyst system is subsequently added while stirring at from 0 to 100° C. The polymerization time can be in the range from 0.1 to 24 hours. preference is given to a polymerization time in the range from 0.1 to 5 hours.

In the above-described process, no deposits are formed in the reactor, no agglomerates are formed and the productivity of the catalyst system used is high. The polymers prepared by the process of the present invention have a narrow molecular weight distribution and a good particle morphology.

The following examples illustrate the invention.

General procedures: Preparation and handling of the compounds were carried out under argon with exclusion of air and moisture (Schlenk technique). All solvents required were dried before use by boiling for a number of hours over suitable desiccants and subsequently distilling them under argon.

EXAMPLE 1

Synthesis of bis(dimethylaluminoxy) pentafluorophenylborane 10 ml of trimethylaluminum (2M in toluene, 20 mmol) and 40 ml of toluene are placed in a reaction vessel. At −10° C., 2.1 g of pentafluoroboronic acid (10 mmol) in 50 ml of toluene are added dropwise to this solution over a period of 15 minutes. The mixture is stirred for 1 hour at −10° C. and subsequently for a further hour at room temperature (RT). The slightly turbid, light-yellow solution is filtered through a G4 frit. This gives a clear, light-yellow solution (0.1M based on boron) of bis(dimethylaluminoxy) pentafluorophenylborane in toluene.

EXAMPLE 2

Synthesis of di[bis(pentafluorophenyl)boroxy] methylalane 5 ml of trimethylaluminum (2M in toluene, 10 mmol) and 45 ml of toluene are placed in a reaction vessel. At −10° C., 6.92 g of bis(pentafluorophenyl)borinic acid (20 mmol) in 50 ml of toluene are added dropwise to this solution over a period of 15 minutes. The mixture is stirred for 0.5 hour at −10° C. and subsequently for a further hour at room temperature. The slightly turbid, light-yellow solution is filtered through a G4 frit. This gives a clear, light-yellow solution (0.1M based on Al) of di([bis(pentafluorophenyl)boroxy] methylalane in toluene.

EXAMPLE 2A

Synthesis of di[bis(pentafluorophenyl)boroxy] methylalane 5 ml of trimethylaluminum (2M in toluene, 10 mmol) and 45 ml of toluene are placed in a reaction vessel. At 25° C., 6.92 g of bis(pentafluorophenyl)borinic acid (20 mmol) in 50 ml of toluene are added dropwise to this solution over a period of 15 minutes. The mixture is stirred for 1 hour at 25° C. The slightly turbid, light-yellow solution is filtered through a G4 frit. This gives a clear, light-yellow solution (0.1M based on Al) of di([bis(pentafluorophenyl)boroxy] methylalane in toluene.

EXAMPLE 3

Reaction of tris(pentafluorophenyl)borane and bis(pentafluorophenyl)borinic acid with trimethylaluminum 5 ml of trimethylaluminum (2M in toluene, 10 mmol) and 40 ml of toluene are placed in a reaction vessel. At −10° C., a mixture of 6.92 g of bis(pentafluorophenyl)borinic acid (20 mmol) and 5.12 g of tris(pentafluorophenyl)borane (10 mmol) in 50 ml of toluene is added dropwise to this solution over a period of 15 minutes. The mixture is stirred for 0.5 hour at −10° C. and subsequently for a further hour at room temperature. The slightly turbid, light-yellow solution is filtered through a G4 frit. This gives a clear, light-yellow toluene solution.

EXAMPLE 4

Application of bis(dimethylaluminoxy) pentafluorophenylborane to a Support 2 g of $SiO_2$ (PQ MS3030, pretreated at 140° C., 10 mbar, 10 hours) are suspended in 30 ml of toluene, and at room temperature 0.6 ml of N,N-dimethylbenzylamine is added. The mixture is cooled to 0° C. and 50 ml of the solution prepared in Example 1 are added dropwise from a dropping funnel. The mixture is allowed to warm to room temperature and is stirred for another three hours. The suspension is subsequently filtered and the solid is washed with pentane. The residue is then dried to constant weight in an oil pump vacuum. This gives 3.03 g of a white support material.

EXAMPLE 5

Application of di[bis(pentafluorophenyl)boroxy] methylalane to a Support 2 g of $SiO_2$ (PQ MS3030, pretreated at 140° C., 10 mbar, 10 hours) are suspended in 30 ml of toluene and, at room temperature 0.48 ml of N,N-dimethylbenzylamine is added. The mixture is cooled to 0° C. and 40 ml of the solution prepared in Example 2 are added dropwise from a dropping funnel. The mixture is allowed to warm to room temperature and is stirred for another three hours. The suspension is subsequently filtered and the solid is washed with pentane. The residue is then dried to constant weight in an oil pump vacuum. This gives 4.01 g of a white support material.

EXAMPLE 6

Application of the Reaction Mixture from Example 3 to a Support 2 g of $SiO_2$ (PQ MS3030, pretreated at 140° C., 10 mbar, 10 hours) are suspended in 30 ml of toluene, and at room temperature 0.48 ml of N,N-dimethylbenzylamine is added. The mixture is cooled to 0° C. and 40 ml of the solution prepared in Example 3 are added dropwise from a dropping funnel. The mixture is allowed to warm to room temperature and is stirred for another three hours. The suspension is subsequently filtered and the solid is washed with pentane. The residue is then dried to constant weight in an oil pump vacuum. This gives 4.5 g of a white support material.

EXAMPLE 7

Preparation of Catalyst System 1

0.5 g of the support prepared in Example 4 are added at room temperature to 5.8 mg of dimethylsilanediylbis(2-methyl-4-phenylindenyl)dimethylzirconium (10 μmol) in 3 ml of toluene. The suspension is stirred briefly and 0.01 ml of trimethylaluminum (TMA) (2M in toluene, 20 μmol) is subsequently added. The catalyst solution is stirred for 1 hour and the solvent is then taken off in an oil pump vacuum. This gives an orange, free-flowing powder.

EXAMPLE 8

Preparation of Catalyst System 2

7 mg of dimethylsilanediylbis(2-methyl-4-(4'-tert-butylphenylindenyl)zirconium dichloride (10 μmol) in 5 ml of toluene are stirred for 40 minutes with 0.02 ml of TMA (2M in toluene, 40 μmol). 0.44 g of the support prepared in Example 5 are subsequently added at room temperature. The catalyst solution is stirred for 1 hour and the solvent is then taken off in an oil pump vacuum. This gives an orange, free-flowing powder.

EXAMPLE 9

Preparation of Catalyst System 3

0.2 g of the support prepared in Example 6 is added at room temperature to 3.3 mg of dimethylsilanediylbis(2-methyl-4-(4'-tert-butylphenylindenyl)-dimethyl zirconium (5 μmol) in 3 ml of toluene. The catalyst solution is stirred for 1 hour and the solvent is then taken off in an oil pump vacuum. This gives an orange, free-flowing powder.

EXAMPLE 10

Polymerization Using Catalyst System 1

A dry 2 l reactor is flushed firstly with nitrogen and subsequently with propylene and charged with 1.5 l of liquid propylene. 3 ml of triisobutylaluminum (TIBA) (20% strength in Varsol) are added thereto and the mixture is stirred for 15 minutes. The catalyst system 1 prepared in Example 7 is subsequently infected as a suspension in 20 ml of heptane and rinsed in with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 160 g of polypropylene powder (PP). The reactor showed no deposits on the inner wall or stirrer. The catalyst activity is 28 kg of PP/g of metallocene×h.

EXAMPLE 11

Polymerization Using Catalyst System 2

A dry 2 l reactor is flushed firstly with nitrogen and subsequently with propylene and charged with 1.5 l of liquid propylene. 3 ml of TIBA (20% strength in Varsol) are added thereto and the mixture is stirred for 15 minutes. The catalyst system 3 prepared in Example 8 is subsequently injected as a suspension in 20 ml of heptane and rinsed in with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 255 g of polypropylene powder. The reactor showed no deposits on the inner wall or stirrer. The catalyst activity is 36 kg of PP/g of metallocene×h.

EXAMPLE 12

Polymerization Using Catalyst System 3

A dry 2 l reactor is flushed firstly with nitrogen and subsequently with propylene and charged with 1.5 l of liquid propylene. 3 ml of TIBA (20% strength in Varsol) are added thereto and the mixture is stirred for 15 minutes. The catalyst system 3 prepared in Example 9 is subsequently injected as a suspension in 20 ml of heptane and rinsed in with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 145 g of polypropylene powder. The reactor showed no deposits on the inner wall or stirrer. The catalyst activity is 44 kg of PP/g of metallocene×h.

We claim:
1. A catalyst system comprising
   a) at least one organometallic compound selected from the group consisting of metallocenes, diamine complexes of metals of transition groups III and IV of the Periodic

Table of the Elements, diimine complexes of metals of transition group VIII of the Periodic Table of the Elements and 2,6-bis(imino)pyridyl complexes of metals of transition group VIII of the Periodic Table of the Elements, b) at least one Lewis base,
c) at least one support and
d) at least one organoelement compound which is the reaction product of at least one compound of the formula (VI) with at least one compound of the formula (IX),

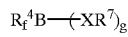  (VI)

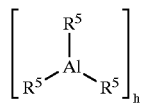  (IX)

where $R^7$ is a hydrogen atom or a boron-free $C_1$–$C_{40}$ group,
$R^4$ and $R^5$ are identical or different and are each a hydrogen atom, a halogen atom or a $C_1$–$C_{40}$ group or $R^4$ is an —$OSiR_3$ group, where R are identical or different and are as defined for $R^5$,
X is an element of main group VI of the Periodic Table of the Elements or an NR group, where R is a hydrogen atom or a $C_1$-$C_{20}$-hydrocarbon radical,
f is an integer from 0 to 3
g is an integer from 0 to 3, where f+g is not equal to 0,
h is an integer from 1 to 10,
where the organoelement compound is covalently bound to the support,
wherein the Lewis base is N,N-diethylbenzylamine, N,N-dimethyl-benzylamine, N-benzyldimethylamine, N-benzyldiethylamine, N-benzylbutylamine, N-benzyl-tert-butylamine, N-benzylisopropylamine, N-benzylmethylamine, N-benzylethylamine, N-benzyl-1-phenylethylamine, N-benzyl-2-phenylethylamine, N,N-dimethylbenzylamine, N,N-diethylbenzylamine, N-methyl-N-ethylbenzylamine, N-methyldibenzylamine or N-ethyldi(benzyl)amine.

2. A catalyst system as claimed in claim 1, wherein the organometallic compound is a metallocene.

3. A catalyst system as claimed in claim 1 which further comprises at least one organometallic compound of the formula III

  (III)

where $M^3$ is an element of main group I, II or III of the Periodic Table of the Elements,
$R^6$ are identical or different and are each a hydrogen atom, a halogen atom or a $C_1$–$C_{40}$ group,
d is an integer from 1 to 3 and
e is an integer from 1 to 4,
as constituent e).

4. A catalyst system as claimed in claim 1, wherein a porous inorganic or organic solid is used as support.

5. A process for preparing polyolefins, in which the polymerization is carried out in the presence of at least one catalyst system as claimed in claim 1.

6. A catalyst system as claimed in claim 1, wherein $R^7$ is a hydrogen atom or $C_1$–$C_{20}$-alkyl, $C_6$–$C_{20}$-aryl, $C_7$–$C_{40}$-arylalkyl or $C_7$–$C_{40}$-alkylaryl.

7. A catalyst system as claimed in claim 1, wherein X is an element of main group VI of the Periodic Table of the Elements or an NR group, where R is a hydrogen atom or $C_1$–$C_{20}$-alkyl or $C_6$–$C_{20}$-aryl.

8. A catalyst system as claimed in claim 1, wherein the Lewis base is benzylamine, N-benzyldimethylamine, N-benzyldiethylamine, N-benzylbutylamine, N-benzyl-tert-butylamine, N-benzylisopropylamine, N-benzylmethylamine, N-benzylethylamine, N-benzyl-1-phenylethylamine or N-benzyl-2-phenylethylamine.

* * * * *